United States Patent [19]

Myers et al.

[11] 4,253,559
[45] Mar. 3, 1981

[54] PALLET LOCATING AND CLAMPING MECHANISM FOR A TRANSFER MACHINE

[75] Inventors: Douglas Myers, Sterling Heights; John Vandenkieboom, Troy, both of Mich.

[73] Assignee: LaSalle Machine Tool, Inc., Troy, Mich.

[21] Appl. No.: 1,729

[22] Filed: Jan. 8, 1979

[51] Int. Cl.³ ............................................. B65G 21/20
[52] U.S. Cl. ..................................... 198/345; 414/222
[58] Field of Search ............................. 198/345, 339; 414/222–226; 74/582

[56] References Cited

U.S. PATENT DOCUMENTS

| | | | |
|---|---|---|---|
| 1,317,788 | 10/1919 | Hinsdale | 74/582 X |
| 2,903,120 | 9/1959 | Thomas | 198/345 |
| 3,213,996 | 10/1965 | Tech | 198/345 |
| 3,690,433 | 9/1972 | Buldini | 198/345 |

*Primary Examiner*—Robert B. Reeves
*Assistant Examiner*—Douglas D. Watts
*Attorney, Agent, or Firm*—Olsen and Stephenson

[57] ABSTRACT

In transfer apparatus for advancing work-supporting pallets from one work station to a successive work station, a locating and clamping mechanism for precisely positioning a pallet at each work station and securing the pallet thereat so that an operation can be performed on work that is supported on the pallet. The locating and clamping mechanism consists of a plurality of lift-pin members, driven by an actuator assembly, and movable up and down into engagement with the underside of the pallet at the work station. At least one of the lift-pin members has a tapered head that is received in a correspondingly-tapered opening in the pallet so as to horizontally orient the pallet. Stop means overlie the pallet at the work station so as to be engaged by the pallet upon its upward movement by the lift-pin members to clamp the pallet at a predetermined position where the work performing operation can be carried out.

2 Claims, 5 Drawing Figures

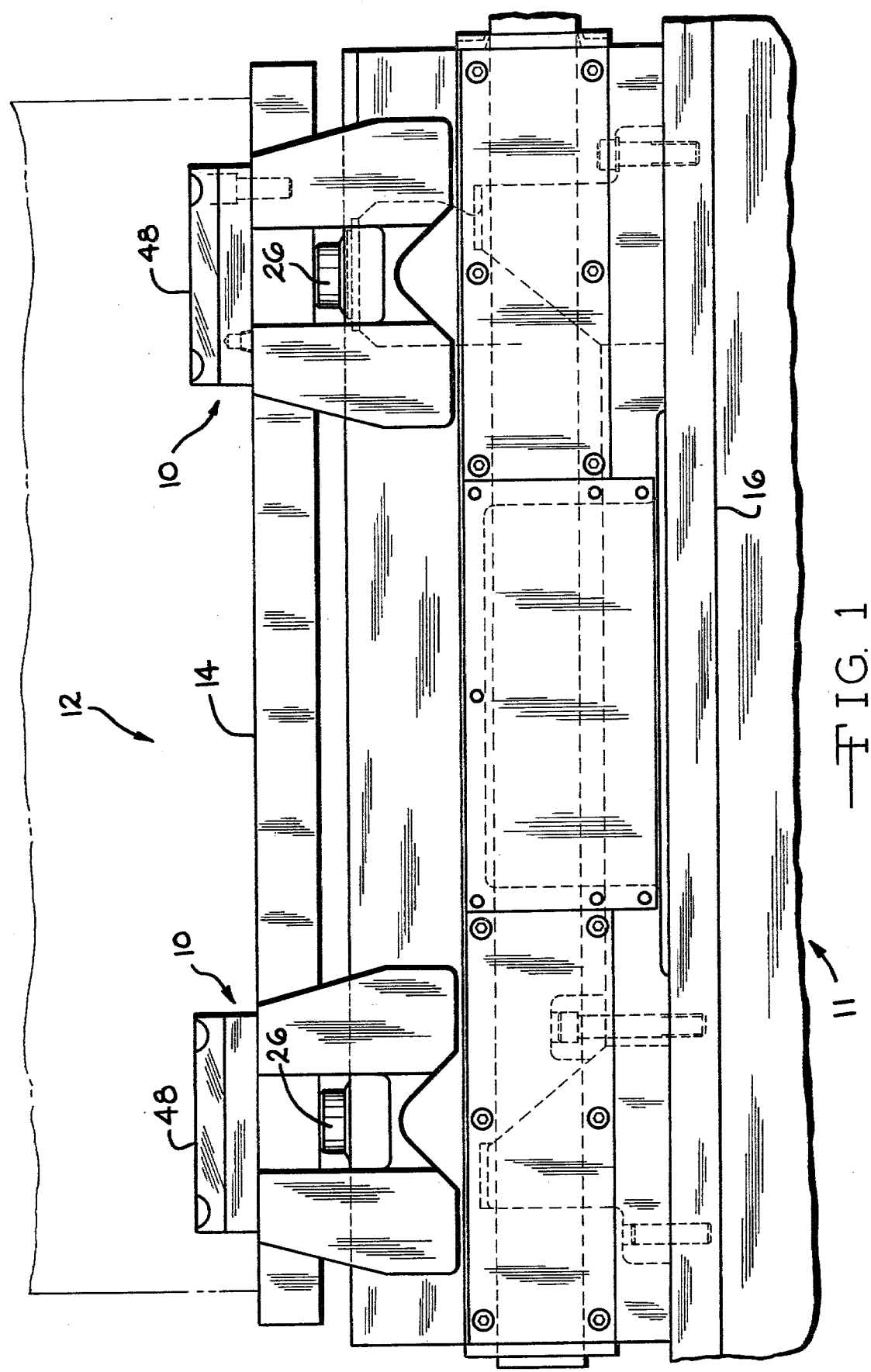

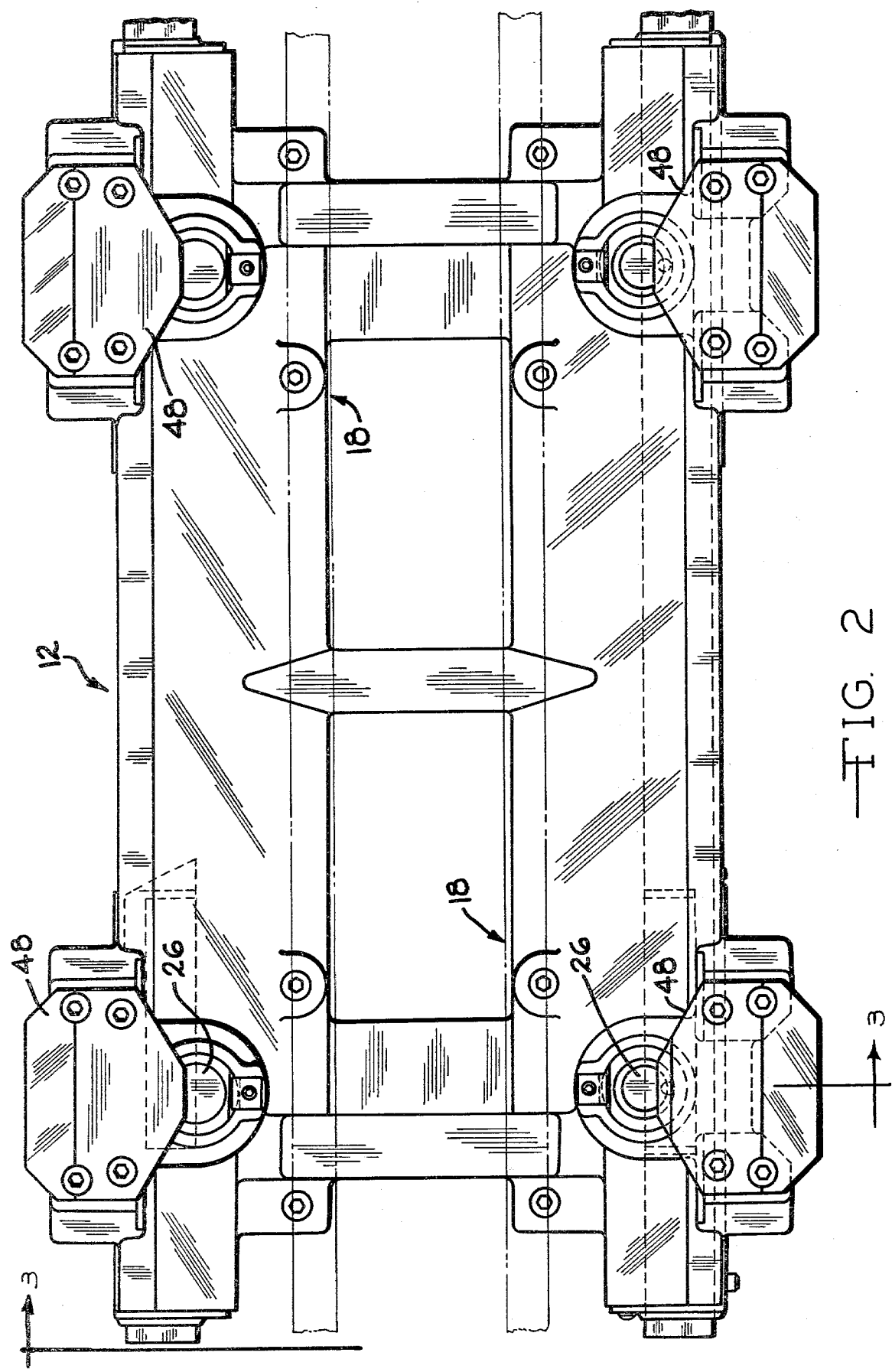

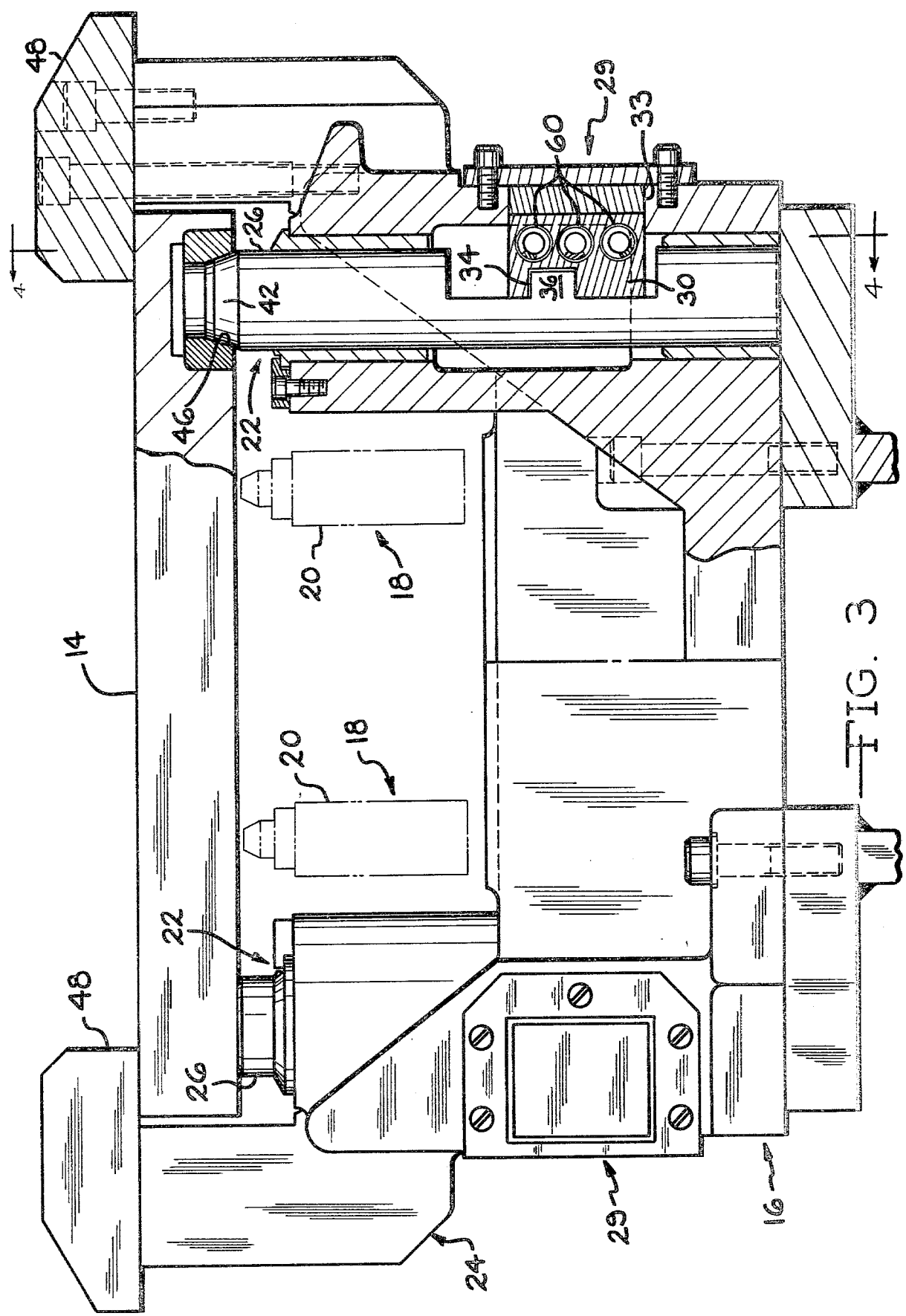

PALLET LOCATING AND CLAMPING MECHANISM FOR A TRANSFER MACHINE

BACKGROUND OF THE INVENTION

The present invention relates generally to transfer apparatus for moving work supporting pallets from station to station so that a plurality of successive operations can be performed on the work mounted on the pallets, and more particularly, to a locating and clamping mechanism for precisely positioning and securing the pallet at each work station.

When performing a series of operations such as grinding, turning, drilling, boring, etc., at successive work stations, it is important, and indeed critical, to accurately position the work piece at each work station relative to the work performing tool so that an accurately machined work piece can be consistently produced. In some systems, the work pieces are grasped and transferred directly between work stations and deposited in fixtures where they are in a position to be machined. These systems sometimes require complex machinery to handle and orient the work pieces to their proper position.

In other systems, the work is secured to a pallet which then is transferred between the work stations and precisely located and clamped at the proper position to put the work piece in the proper location where it can be machined. Still, the pallet must be precisely located and secured to enable the consistent accurate machining of a plurality of work pieces. It is the object of the present invention, therefore, to provide an improved locating and clamp-up mechanism for precisely locating and securing a pallet at a predetermined position at a work station to enable the machining of the work piece supported on the pallet.

SUMMARY OF THE INVENTION

In accordance with the present invention, a locating and clamp-up mechanism is provided at each work station in a transfer system to position and secure a pallet at a predetermined position at each work station. The locating and clamping mechanism at each work station consists of a plurality of pin members, usually four in number, which are positioned for up and down movement at the work station. An actuator lift assembly is engageable with the lift-pin members and serves to elevate and lower the lift-pin members to clamp and release the pallet at the work station. The actuator lift assembly consists of drive members which are horizontally reciprocal and which are engageable with associated lift-pin members so that a forward stroke of the actuator assembly drive members provides for the simultaneous raising of all the lift-pin members and the return stroke of the actuator lift assembly lowers the lift-pin members.

Transfer apparatus shuttles the pallet to the work station. The pallet has openings formed in its underside, each of which receives an associated lift-pin member when the actuator lift assembly is operated. At least one of the lift-pin members has a tapered head portion at its upper end which mates with a correspondingly tapered opening in the pallet. The tapered construction of the lift-pin member and the pallet opening accurately positions the pallet in the proper horizontal orientation as the pallet is being lifted.

Stop means in the form of overhanging support members overlie the pallet when it is in its lowered position at the work station. Thus, upwardly movement of the lift-pin members elevates the pallet and engages it against the stop means. Continued application of upwardly directed forces by the lift-pin members secures the pallet to clamp it in the predetermined position where work can be performed on the work pieces supported on the pallet. After the work has been machined, the actuator assembly is driven in a return stroke to lower the lift-pin members and the pallet onto the transfer mechanism. The transfer mechanism then advances the pallet to the successive work station where it is again precisely located and clamped in its predetermined position.

Further objects, features, and advantages of the present invention will become apparent from a consideration of the following description when taken in connection with the appended claims and the accompanying drawing in which:

FIG. 1 is an elevational view of a work station showing a pallet clamped in its predetermined position;

FIG. 2 is a plan view of the work station showing the locating and clamping mechanism of the present invention;

FIG. 3 is an elevational view taken substantially from line 3—3 in FIG. 2 with portions broken away to show the locating and clamping mechanism of the present invention;

Figures 4, 5:
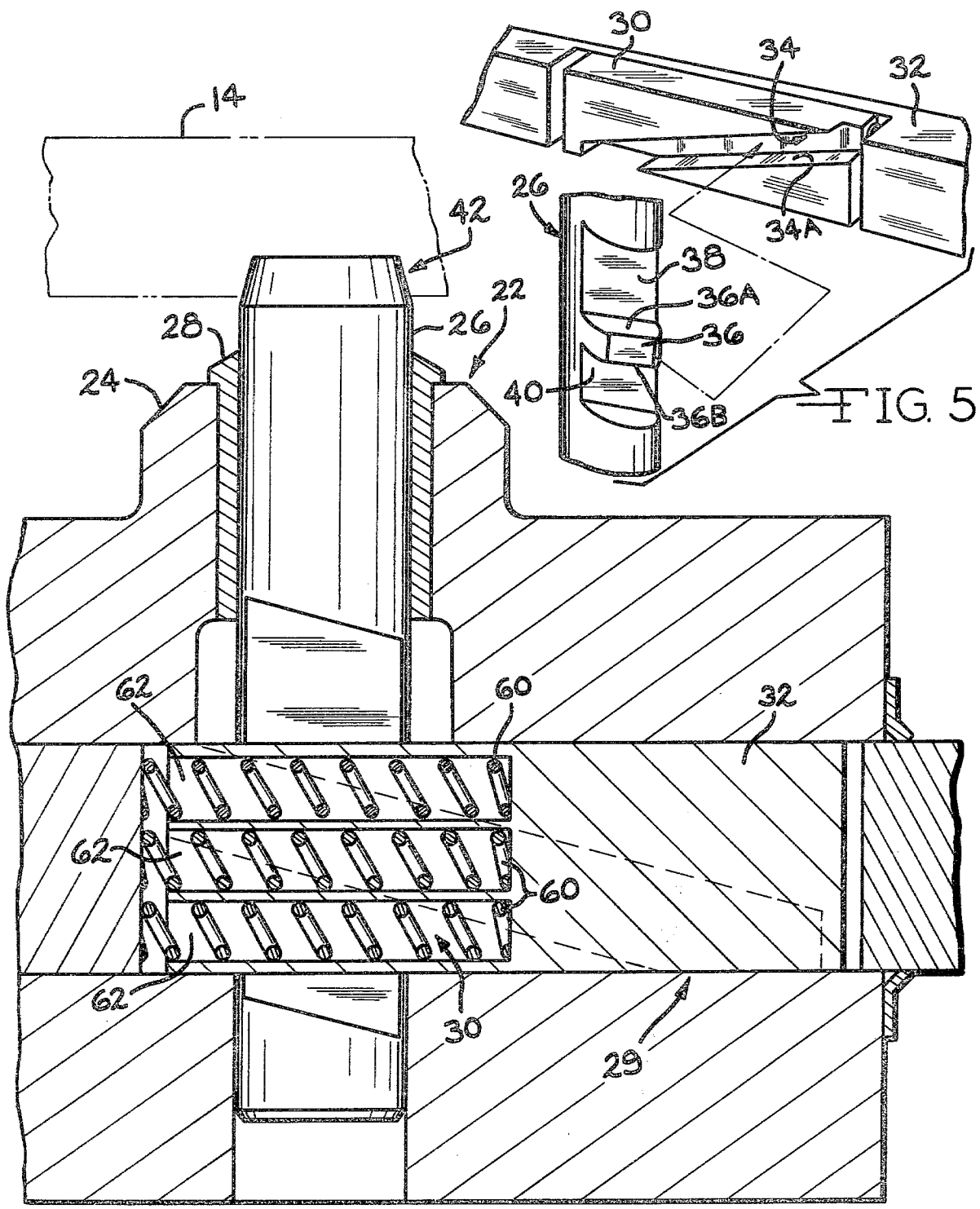
FIG. 4 is a sectional view showing in greater detail the lift and clamping mechanism along with the actuator assembly of the present invention.
FIG. 5 is an exploded view showing a portion of a lift-pin member of the lift and clamping mechanism and showing its relationship with the actuator assembly of the present invention.

Referring to the drawing, the locating and clamp apparatus of the present invention, indicated generally at 10, is shown in FIG. 1 at a work station 12 in base apparatus 11 which serves to transfer work supporting pallets, one shown 14 at the work station 12, from one work station 12 to a successive work station 12. The pallets 14 each support work pieces (not shown) which are secured thereto and which must be precisely located at the work station 12 so that a consistent and properly dimensioned work piece can be formed. The base apparatus 11 consists of a support frame 16 upon which the locating and clamp apparatus 10 is mounted and a transfer mechanism 18, shown more clearly in FIG. 3, which serves to transfer the pallets 14 between adjacent work stations 12. The transfer mechanism 18 consists of locators 20 which when actuated, engage the underside of the pallet at the work station 12 and carry the pallet to the next work station 12.

The pallet 14 is positioned over four lift assemblies 22 which elevate the pallet 14 from a lower position to an upper predetermined position locating the work pieces on the pallet 14 in the proper position where they can be machined. The lift assemblies 22 form the locating and clamp mechanism 10 and each assembly 22 consists of a housing 24 (FIGS. 3 and 4) in which an upright pin member 26 is disposed for up and down movement. Interposed between the pin 26 and housing 24 are sleeve members 28 which insure that the movement of the lift-pin members 26 is along a predetermined axial path. Each lift-pin member 26 is located at a corner of the work station 12 to engage pallet 14 near its corners. The lift-pin members 12 engage the pallet when simultaneously elevated and lift the pallet 14 to its predetermined position where an operation can be performed on the work on the pallet 12.

The lift assemblies 22 are operated by an actuator lift assembly 29, shown in FIGS. 3–5, which operates to lift and retract the lift-pin members 26. The actuator lift assembly 29 consists of a relatively moveable drive member 32. Interposed in the drive member 32 is a spring unit 30 which absorbs the closing forces developed by the drive member 32 when the actuator assembly 29 is driven. The drive member 32 and the spring unit 30, which are horizontally reciprocal, are maintained in a longitudinal channel 33 and are engageable with the lift-pin members 26. The lift actuator assembly 29 includes indentical spring units 30 and drive members 32 on each side of the work station 12, as shown in FIG. 3. The actuator assembly 29 is suitably coordinated so the lift-pin members 26 on each side of the work station 12 are raised simultaneously.

An inclined channel 34 is formed in the spring unit 30 and receives a rib member 36 that is formed by a pair of adjacent spaced apart recesses 38 and 40 in the lift-pin member 26. The projecting member 36 has inclined surfaces 36A and 36B and is disposed in the inclined channel 34 so that the surface 36B is substantially parallel to and engageable with an inclined cam surface 34A formed in a channel 34. The surface 36A is similarly substantially parallel to an inclined cam surface 34B formed on the upper end of the channel 34. Accordingly, with the projecting member 36 disposed in the channel 34, forward movement of the actuator assembly 29 causes the inclined surface 36B of the projecting member 36 to ride upwardly on the surface 34A. The forward movement of the spring unit 30 therefore elevates each lift-pin member 26. The return stroke of the drive members 32 and spring unit 30 positively lowers the lift-pin members 26 since the upper surface 36A of the rib 36 engages the surface 34B in the channel 34 upon the return stroke to lower the lift-pin member 26 if gravity has not already lowered the lift-pin member 26.

Positioning means is provided to accurately position the pallet 14 in the proper horizontal orientation. At least one of the lift-pin members 26 has a tapered head portion 42, as shown in FIG. 4. This tapered head portion 42 is received by a correspondingly tapered opening 46 formed in the underside of the pallet 14, as shown in FIG. 3. So, upward movement of the lift-pin member 26 having the tapered head portion 42 into the opening 46 adjusts pallet 14 in the proper horizontal position. It is to be understood that the transfer mechanism 18 is constructed and operated so as to place the pallets 14 reasonably close to its proper horizontal orientation so that the final adjustment occurs when the lift members 26 are raised.

Upward movement of the lift-pin members 26 elevates the pallet 14 toward its predetermined position. Stop means in the form of a plurality of support members 48 are secured to the clamp mechanism 10 and overlie the pallet 14 in its lower position at the work station 12 so that the upward movement of the pallet 14 is terminated when the pallet 14 engages the support members 48. As noted previously, the tapered head portion 42 of the lift-pin member 26 positions the pallet 14 in its proper horizontal location. Accordingly, continued application of the upwardly directed forces by the lift-pin members 26 when the actuator assembly 29 has been driven in the forward stroke clamps the pallet 14 in its predetermined position. The return stroke of the actuator assembly 29 lowers the lift-pin members 26 and lowers the pallet 14 to its lower position where it rests upon the transfer assemblies 18. The transfer assemblies 18 are then actuated to transfer the pallet 14 and carry it to the successive work station 12.

As seen in FIG. 4, the spring unit 30 consists of parallel springs 60 which are disposed in openings 62 formed in the spring unit 30. During the forward stroke of the actuator assembly 29 in the left hand direction, as viewed in FIG. 5, the drive member 32 is pushed toward the spring unit 30 and the springs 60 cushion the closing movement of the drive members 32 and spring unit 30 to insure smooth operation of the actuator assembly 29. Similarly, the return stroke is accomplished by pushing the spring unit 30 toward the drive member 32 thereby taking advantage of the springs 60 in the return stroke to insure the continued smooth operation of the actuator assembly 29.

As can be seen from the above description, an improved locating and clamp-up assembly 10 is provided for securing pallets 14 at their respective work stations 12 in a predetermined position where the work pieces thereon are in the proper location to be machined. The clamp-up assembly of the present invention insures a consistent, accurate clamping of each pallet 14 at the work station 12 so that properly dimensioned work pieces can be machined.

What is claimed:

1. In transfer apparatus for advancing work support members to a work station, means for clamping a work support member at a predetermined position at said work station comprising a reciprocally movable clamping member at said work station, a first drive member operable to actuate said clamping member, coacting cam means on said clamping member and on said first drive member for transmitting the movement of said first drive member to said clamping member, a second drive member for moving said first drive member in a direction to cause said clamping member to engage a work support member at said work station, means enabling a predetermined amount of relative movement between said drive members, abutment means acting between said drive members to transmit the movement of said second drive member to said first drive member, and spring means acting between said drive members to constrain relative movement between said drive members when said clamping means is actuated, said spring means being substantially enclosed in said drive members so as to be essentially free from foreign matter.

2. The clamping means according to claim 1, wherein said spring means comprises means forming openings in one of said drive members, and spring members disposed in said openings and engageable with the other of said drive members when said drive members are moved toward each other.

* * * * *